Nov. 17, 1931.   P. E. FENTON   1,832,830
RESILIENT SNAP FASTENER ELEMENT
Filed Sept. 27, 1928
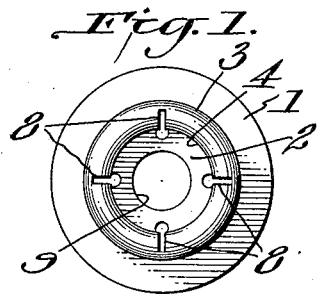
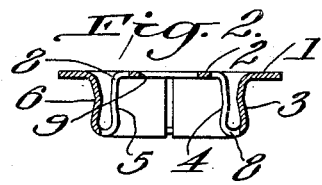
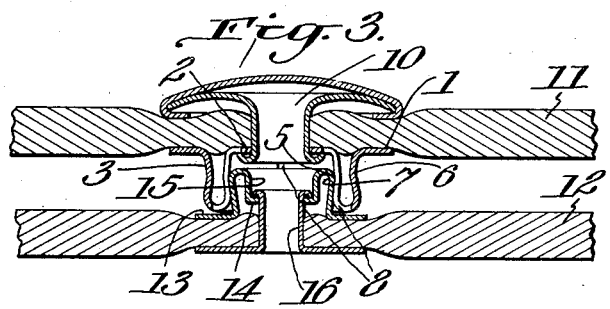

Patented Nov. 17, 1931

1,832,830

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

RESILIENT SNAP FASTENER ELEMENT

Application filed September 27, 1928. Serial No. 308,828.

The object of this invention is to provide a sturdy, long-lived snap fastener element, preferably a socket.

In the specific illustration of the invention herein explained, the invention consists of a socket having an outer rim and an inner rim, both of which are rigid or non-resilient, and an integral intermediate connection projecting from the adjacent edges of the rims, in the form of an outer wall and an inner wall, the inner wall being slotted longitudinally so as to impart a degree of resilience to the article, the slots extending short of the edge of the inner rim, the inner rim being perforated to receive and to be engaged by a suitable setting or attaching element, as I will proceed now to explain more fully and finally claim.

In the accompanying drawings illustrating the invention, in the several figures of which like parts are similarly designated, Figure 1 is a top plan view, and Fig. 2 is a vertical section of one form of resilient socket embodying the invention. Fig. 3 is a vertical section illustrating a snap fastener couple attached to parts to be fastened, the socket element showing the present invention.

The resilient snap fastener element of this invention is the same as those disclosed in my applications filed September 11, 1928, Serial Nos. 305,191 and 305,192, excepting that only the inner wall is slotted instead of both walls; and it differs from the device of my application filed September 27, 1928, Serial No. 308,829, patented October 22, 1929, No. 1,732,837, in that its inner wall only is slotted.

The outer rim 1, and the inner rim 2, lie in substantially the same plane, with the intermediate rim-connecting material extending therefrom substantially normal thereto, and bent to form the outer wall 3 and the inner wall 4. These walls are bowed, knurled or curved at 5 and 6, respectively, to provide surfaces adapted to engage the complemental stud 7, to effect a union of the snap fastener couple, as illustrated in Fig. 3.

The inner wall 4, is slotted at 8, from the top toward but not through the inner rim 2; or the slots may extend short of the rim 2. These slots may extend into the meeting portions of the outer and inner walls, as herein shown.

The inner rim 2, has a central perforation 9, to receive and be engaged by a capped eyelet 10, the barrel of which is clinched therein, as shown in Fig. 3, to set or attach the element; but the invention is not limited to the means for setting or attaching, nor to any particular form of stud.

The part 11 may represent one portion of an article to be fastened, on which the socket is set, and the part 12 may represent the other portion on which the stud is set.

As shown in Fig. 3, the stud 7 has an outer rim 13, an inner rim 14 and a connecting wall 15, all of which parts are rigid; and the attaching post or rivet 16 by which the stud is attached to the part 12, is passed through the part 12 and an opening in the rim 14 and clinched therein.

The two rims, 1 and 2, and their connecting walls 3 and 4, are in one unitary piece, thus effecting economy in construction and possessing great sturdiness. The outer wall acts as an auxiliary unit to the inner wall in providing a long-lived snap action; and it also provides a support for the inner resilient wall which prevents crushing under the damaging effects of laundering.

The slotting of the inner wall effects a breaking down of the rigidity of that particular wall and serves to provide some resiliency, and this is backed up by the opposite nonresilient outer wall serving as an auxiliary.

The proven fact is that a very few thousandths of an inch of give furnishes the necessary resilient action. It is possible, also, that the solid metal is weakened by the inclusion of the slots just enough to permit a slight amount of give or resiliency.

Variations in the details of construction are permissible within the principle of the invention and the claims following.

What I claim is:—

1. A resilient snap fastener element, made in one unitary piece, and having an outer rim and an inner rim, and an outstanding connection bent to form an outer wall and an inner wall serving to unite these rims, the inner wall being slotted longitudinally from the bend, and the outer wall left solid.

2. A resilient snap fastener element, made in one unitary piece, and having an outer rim and an inner rim, and an outstanding connection normal to the rims and bent to form an outer wall and an inner wall, the inner wall being slotted longitudinally from the bend, and the outer wall unslotted, the inner rim having an opening to receive and be engaged by an attaching device.

In testimony whereof I have hereunto set my hand this 26th day of September, A. D. 1928.

PAUL E. FENTON.